April 15, 1930.　　　T. JACKSON　　　1,755,007

BUMPER BAR

Filed March 20, 1929

Inventor
Thomas Jackson
By James L. Norris
Attorney

Patented Apr. 15, 1930

1,755,007

UNITED STATES PATENT OFFICE

THOMAS JACKSON, OF MOUNT HAWTHORN, NEAR PERTH, WESTERN AUSTRALIA, AUSTRALIA

BUMPER BAR

Application filed March 20, 1929, Serial No. 348,609, and in Australia October 22, 1928.

This invention has for its object the provision of a bumper bar for motor cars, in which the bumper possesses a resilient or shock absorbing nature. The essential feature of the invention resides in a longitudinal tube in which are contained compression and tension springs operating between pistons which latter are connected to the forward ends of hinged arms, the latter being pivoted at their rear ends on fixed pivots carried by the chassis.

The construction and use of the invention will be described with reference to the accompanying drawings in which Fig. 1 is a sectional plan view of the tube showing the springs and pistons therein and the arms associated therewith.

Referring to said drawings:—

Figure 1:
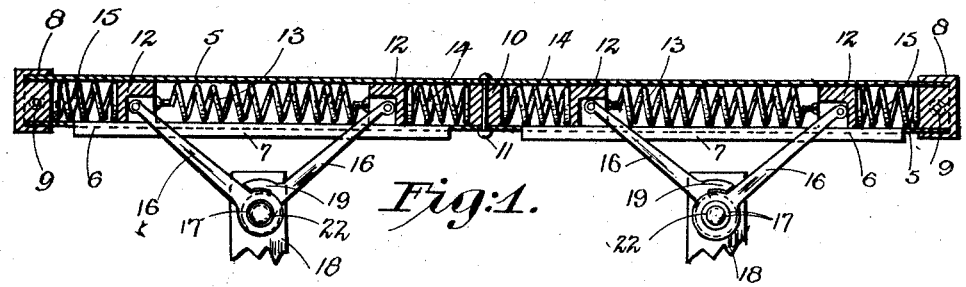
Figure 2:
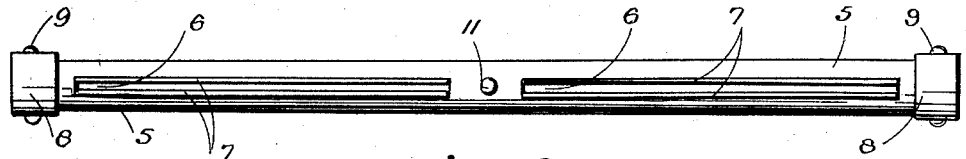
Fig. 2 is a rear elevation of the tube.
Figure 3:
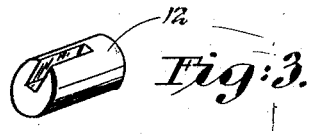
Fig. 3 is a perspective view of one of the pistons.

The invention comprises a tube 5 having longitudinal slots 6 having lips or flanges 7 formed integrally therewith and extending outwardly from said slots to act as guides for the arms hereinafter referred to. The tube is closed at both ends by caps 8 which are secured to the tube in any suitable manner, for example by pins 9 extending diametrically through said caps and tube. A block 10 is secured in the tube, midway between the ends of the latter, as by a pin 11 extending diametrically through the tube and said block. The block 10 thus divides the tube into two longitudinally aligned parts. A pair of pistons 12 is slidable in each part of the tube and the pistons comprising each pair are connected by a spring 13 which tends to draw them together.

Between each of the inner pistons and the central block 10, operates a compression spring 14, while a compression spring 15 is mounted between each of the caps 8 of the tube and the piston immediately adjacent to such cap. To each of the pistons 12 is hingeably secured a rearwardly extending arm 16, the outer terminals of each pair of said arms being mounted on a pivot pin 17 carried by an anchor bracket 18 which brackets are secured to the car.

One of each pair of arms is formed with a limit stop 19 which makes engagement against its companion arm.

Figure 4:
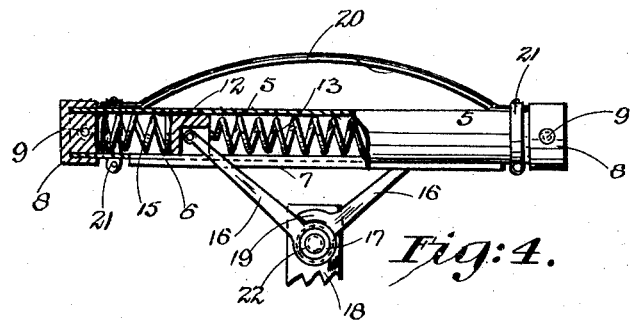
Fig. 4 is a plan view, partly in section, showing a bowed bumper bar secured to the tube.

As shown in Fig. 4, the tube may, in some cases, be fitted with a bowed shaped auxiliary bumper bar 20, secured to the tube 5 by clip brackets 21.

The pivot pins 17 are provided with oiling nipples 22.

Assuming the bumper bar to be mounted on the forward end of the chassis of a motor vehicle, the operation of same is as follows:

If the vehicle strikes an object head on, the impact of the bumper bar with such object will tend to move the bumper bar rearwardly toward the forward end of such vehicle. But since the bumper bar is supported by the arms 16 and since the rear ends of each pair of arms are pivoted on one of the pivot pins 17 mounted on the forward end of the chassis of the vehicle, said ends cannot move rearwardly independently of the vehicle. Consequently the forward ends of both pairs of arms 16 will be spread apart and both pairs of pistons 12 to which said arms are articulated will be moved toward the central block 10 and the caps 8 at the ends of the tube, respectively. The springs 13, as well as the springs 14 and 15, will yield to permit such movement and to absorb the impact. When the obstacle with which the bumper has come into contact is removed or when the vehicle is backed away from such obstacle, the springs 13, 14 and 15 will move each pair of pistons toward one another, thus swinging the pairs of arms 16 toward one another on their pivot pins 17 until their further movement in that direction is prevented by the limit stops 19. But if a portion of the bumper bar outwardly of either of the pivot pins 17 encounters an object, only the pair of arms 16 associated with the same end or portion of the bumper bar will be spread apart and the other end or portion of the bumper bar and the pair of arms 16 associated with the latter end or portion may swing as a unit on the pivot pins 17 of the latter arms as a center.

What I claim as my invention and desire to secure by Letters Patent, is:—

1. A bumper bar for motor cars, comprising a tubular member closed at each end and having a longitudinal slot, a pair of pistons slidable in said tubular member, yieldable means between each of said pistons and the adjacent end of the tubular member, and a pair of arms having their forward ends extending through said slot and articulated, respectively, with one of said pistons, said arms having their rear ends mounted to swing on a common vertical pivot.

2. A bumper bar according to claim 1 wherein a flange projects outwardly from each edge of the longitudinal slot of the tubular member and the arms are slidably mounted between said flanges.

3. A bumper bar according to claim 1 including spring means connecting the pistons in the tubular member and tending to draw said pistons toward one another.

4. A bumper bar according to claim 1 comprising a bowed member and clips carried by said bowed member adjacent each of its ends and embracing the tubular member.

5. A bumper bar for motor cars, comprising a pair of longitudinally aligned tubular members, each having a longitudinal slot and each closed at both of its ends, a pair of pistons working in each of said tubular members, a pair of pivot pins for mounting on the chassis of a motor car, a pair of arms associated with each of said tubular members, the arms of each pair having one of their ends pivoted on one of said pivot pins and their opposite ends extending through the longitudinal slot of one of said tubular members and articulated, respectively, with the pistons therein, and means tending to move the pistons in each of said tubular members toward one another.

6. A bumper bar according to claim 5 wherein each tubular member has a pair of flanges extending outwardly therefrom and between which the arms associated with such tubular member are supported for slidable movement.

7. A bumper bar according to claim 5 wherein the arms of each pair of arms are provided with cooperating abutments to limit the swinging movement of such arms on their pivots in one direction.

8. A bumper bar according to claim 5 wherein the pistons in each of the tubular members are connected by means tending to draw said pistons together.

In testimony whereof I have hereunto set my hand.

THOMAS JACKSON.